United States Patent

[11] 3,568,815

[72] Inventor Raymond L. Wiseman
Santa Ana, Calif.
[21] Appl. No. 747,869
[22] Filed July 26, 1968
[45] Patented Mar. 9, 1971
[73] Assignee Sta-Hi Corporation
Newport Beach, Calif.

[54] OUTFEED CONVEYOR MECHANISM OF A CONVEYOR SYSTEM FOR CONVEYING UNITS SUCH AS STACKS OF PUBLICATIONS AND THE LIKE
21 Claims, 6 Drawing Figs.

[52] U.S. Cl. .................................................. 198/23,
93/93, 198/164
[51] Int. Cl. .......................................................B65g 15/14,
B65g 47/04, B65b 33/14
[50] Field of Search ........................................ 198/23, 24,
31(A2), 76, 105—106, 110, 164; 93/93.3
(Inquired)

[56] References Cited
UNITED STATES PATENTS
1,219,900 3/1917 Alvey ............................ 198/24
2,038,809 4/1936 Tallman ....................... 198/76X
2,993,583 7/1961 Sykes ............................ 198/31(A2)
3,019,886 2/1962 Winkler ....................... 93/93.3
3,254,752 6/1966 Bauch ............................ 198/105X
3,491,508 1/1970 Standley ....................... 198/164X
FOREIGN PATENTS
970,519 9/1958 Germany ....................... 198/110

Primary Examiner—Edward A. Sroka
Attorney—Mahoney, Hornbaker and Schick

ABSTRACT: A preceding stacker deposits a stack of publications vertically downwardly between transversely spaced guide surfaces onto a longitudinal unit receiving surface of an outfeed conveyor at a unit receiving station. Both the unit receiving surface and at least a pair of pushers are intermittently simultaneously movable in either longitudinal direction to move the deposited stack in either longitudinal direction from the unit receiving station onto and across sets of freely rotatable, low inertia rollers. The pushers are normally positioned one at either longitudinal end of the unit receiving station during said stack deposit to straddle said stack and are synchronized for movement with the unit receiving surface, one across the unit receiving station while the other moves away from the station end, dependent on the direction of stack movement.

PATENTED MAR 9 1971

INVENTOR
RAYMOND L. WISEMAN
BY
MAHONEY, HORNBAKER
& SCHICK
ATTORNEYS

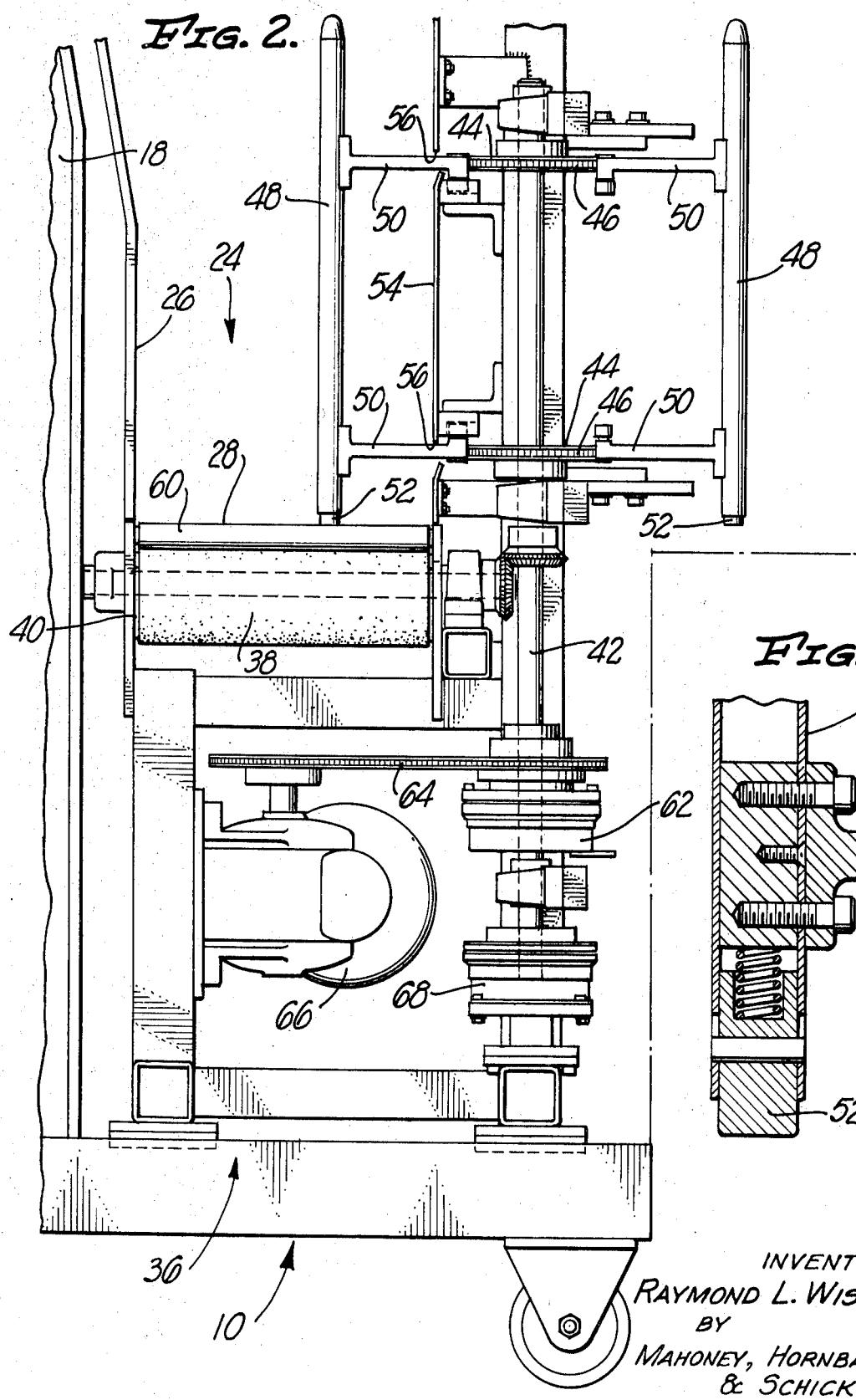
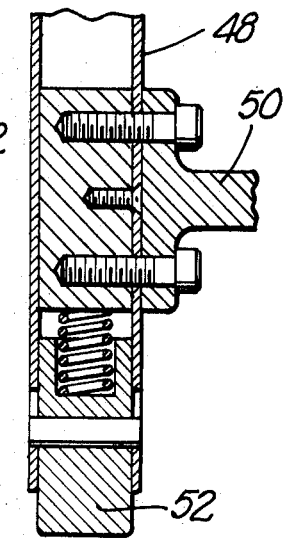
INVENTOR
RAYMOND L. WISEMAN
BY
MAHONEY, HORNBAKER
& SCHICK
ATTORNEYS

INVENTOR
RAYMOND L. WISEMAN
BY
MAHONEY, HORNBAKER
& SCHICK
ATTORNEYS

OUTFEED CONVEYOR MECHANISM OF A CONVEYOR SYSTEM FOR CONVEYING UNITS SUCH AS STACKS OF PUBLICATIONS AND THE LIKE

BACKGROUND OF THE INVENTION

This invention relates to an outfeed conveyor mechanism for conveying units, such as stacks of publications and the like, from a unit receiving station at which said units are deposited by a preceding conveyor mechanism such as a publication stacker. More particularly, this invention relates to an outfeed conveyor mechanism of the foregoing general character wherein the deposited units are preferably moved or conveyed away from said unit receiving station either of opposite longitudinal directions, depending on the direction preselected for that particular deposited unit. Furthermore, the movement of the unit from said unit receiving station is preferably accomplished by combined and synchronously movable end pusher mechanism and a unit receiving surface, the unit being deposited longitudinally between said pusher mechanisms and upon said unit receiving surface from the preceding conveyor mechanism.

Certain prior forms of outfeed conveyor mechanisms have heretofore been provided for receiving the deposit of units thereon from a preceding conveyor mechanism and moving said units away from the point of deposit. For instance, in a publication conveyor system of a printing plant, the publications are automatically printed and folded into a final folded form and are then automatically conveyed in a continuous, imbricated stream to a stacker mechanism. At the stacker mechanism, the publications are automatically placed in unitary stacks and deposited in said stacks at a unit receiving station of an outfeed conveyor mechanism which must, in turn, move the stacks away from the stacker mechanism and to a location where said stacks can be bound sufficient for transportation.

Possibly the most common prior form of outfeed conveyor mechanism has merely included a series of spaced, freely rotatable rollers arranged in a longitudinal path slightly sloping away from the unit receiving station. The units deposited at the unit receiving station, therefore, merely move by gravity downwardly along the series of rollers away from the unit receiving station. In order to insure a proper deposit of the publication stacks from the stacker mechanism onto the outfeed mechanism without disarrangement of the publications in said stacks and also to insure the conveying of said stacks away from the stacker mechanism without such disarrangement, it has been necessary to maintain the slope of the longitudinal path of outfeeding rollers relatively slight so that the outfeed conveying of the publication stacks has been relatively slow.

Although this prior form of outfeed mechanism was perfectly satisfactory in past years when the printing of the publications, and the subsequent conveying and stacking thereof was relatively slow, with the advent of more modern technology, the printing, conveying and stacking operations were greatly increased in speed, thereby requiring that the publication stacks be conveyed away from the stacker mechanism at much greater speeds than had heretofore been possible. Such requirements brought on the advent of positively driven outfeed mechanisms and this was accomplished merely by providing the longitudinal line of outfeed rollers with a rotatable drive so that the publication stacks are positively driven away from the point of stacker deposit, rather than depending solely on gravity to accomplish such movement. Although this would appear to be a rather simple solution to the problem, with the demands for ever increasing speed of printing, conveying and stacking, and, again, modern technology providing such increased speed and satisfying such demand, as well as more efficient and overall space saving printing plant layouts, many further serious problems have been presented required to be met by the outfeed mechanisms.

The most obvious major problem occasioned by the greatly increased speed of the stacker deposits of the publication stacks onto the outfeed mechanism is the fact that as soon as the publication stacks are deposited on the outfeed mechanism, they must immediately be removed from the point of deposit in order to permit deposit of the next publication stack. At the instant of deposit of the particular publication stack onto the outfeed mechanism, of course, such stack is necessarily longitudinally stationary, yet in order to prevent a slowdown in the entire printing and stacking operation, it is necessary to immediately impart relatively high longitudinal speed to the particular publication stack. Merely increasing the speed of rotatable drive of the outfeed rollers will not solve this problem for the simple reason that imparting high speed motion to the lowermost of the publications in the stack through the increased outfeed roller speed does not take into consideration that the remaining publications in the stack thereabove create a relatively large mass which tends to resist this high speed motion, resulting in sliding separation between the individual publications in the stack and complete vertical disarrangement of said stack.

A further problem presented by the space saving and increased efficiency techniques in modern printing plant layout is the requirement in outfeed mechanisms that such outfeed mechanisms will be capable of outfeed conveying of the deposited publication stacks in multiple directions, preferably opposite longitudinal directions. For instance, one printing plant layout might require the outfeed conveying of publication stacks in one longitudinal direction, while another printing plant layout might require such outfeed conveying in the opposite longitudinal direction, requiring an outfeed mechanism to serve in either instance to be versatile in this respect. More important, however is the fact that many modern printing plant layouts require such outfeed conveying of the publication stacks to be intermittently in each of said opposite longitudinal directions, certain of said stacks being required to be conveyed in one longitudinal direction while others of said stacks being required to be conveyed in the opposite longitudinal direction.

Thus, it is desirable for a modern outfeed mechanism usable in publication printing plants to be not only extremely high speed, but to be versatile for a choice of printing plan layout and capable of removing publication stacks deposited thereon in opposite longitudinal directions at said high speeds while maintaining the stack vertical arrangement. This multitude of requirements has not been satisfied by the prior outfeed mechanisms.

OBJECTS AND SUMMARY OF THE INVENTION

It is, therefore, an object of this invention to provide an outfeed conveyor mechanism adapted for use in a high speed publication printing plant which may be constructed for supporting the publication stack not only horizontally, but also with side vertical support preventing disarrangement of said publication stack during the initiation of the outfeed conveying thereof. The outfeed conveyor mechanism may be constructed with both the stack horizontal receiving surface and at least a single pusher mechanism, or at least said pusher mechanism movable for moving the particular deposited stack generally horizontally and longitudinally away from its point of deposit. The pusher mechanism engages the stack vertical surface at the opposite end of said stack from the direction of longitudinal movement so that the pusher mechanism not only imparts horizontal movement to the stack, but at the same time, during said imparting of movement or longitudinal urging, provides vertical support for the stack to prevent the disarrangement thereof.

It is a further object of this invention to provide an outfeed conveyor mechanism adapted for use in a high speed publication printing plant which may be constructed for conveying a stack of publications deposited thereon in either of opposite longitudinal directions away from the point of deposit. The unit or stack receiving surface of the outfeed conveyor mechanism may be provided intermittently, reversible movable, or opposite end stack engaging pushers may be provided for said opposite movement, or both said receiving surface and said pushers may be provided with said opposite movement, dependent on the particular publication printing plant requirements, variations in layout of said printing plant, variations in type and form of publications being printed and the speed requirements of the particular printing plant operation. In the case where the end pusher mechanisms are provided, either with the stack receiving surface movable or stationary, one of said pusher mechanisms is normally positioned at each of the longitudinal ends of the publication stack when the stack is deposited and immediately thereafter, one of the pusher mechanism moves longitudinally across the stack receiving surface pushing the stack therefrom while the other of the pusher mechanisms moves away from the stack receiving surface, the direction of movement of said pusher mechanism being dependent on the particular longitudinal direction of movement intended for the publication stack.

It is still a further object of this invention to provide an outfeed conveyor mechanism adapted for use in a high speed publication printing plant wherein during the deposit of a particular publication stack onto the outfeed conveyor mechanism and during initial longitudinal movement of said publication stack longitudinally along and from the outfeed conveyor mechanism, the publication stack may be provided with full side vertical support insuring that the stack will remain in orderly stack arrangement despite the radical changes in direction of movement of said stack and the imparting of relatively high moving velocity thereto. The outfeed conveyor mechanism is preferably arranged for cooperation with a portion of the preceding conveyor mechanism, such as a publication stacker, so that opposite, transversely spaced, vertical guide surfaces are provided between the outfeed conveyor mechanism and the preceding conveyor mechanism, such transversely spaced guide surfaces cooperating with the previously discussed end longitudinally straddling pusher mechanisms to give four-sided vertical support to the publication stack. Thus, the publication stack is fully side and end supported during the deposit thereof onto the stack receiving surface of the outfeed conveyor mechanism and during the initial part of longitudinal movement away from the stack receiving surface in either longitudinal direction.

It is also an object of this invention to provide an outfeed conveyor mechanism adapted for use in a high speed publication printing plant having unique means thereon for automatically slowing the longitudinal speed of the particular publication stack immediately upon the same being removed from the location of deposit so as to adapt the outfeed conveyor mechanism for direct connection to slower speed and more conventional conveyor lines. In either the single directional or opposite directional outfeed conveyor mechanisms, both forms being hereinbefore discussed, a group or groups of freely rotatable, low inertia rollers are provided longitudinally aligned with the stack receiving surface of the outfeed conveyor mechanism so that even though the particular publication stack is moved longitudinally away from said stack receiving surface at relatively high speed, the movement thereof over the low inertia rollers will immediately decrease the longitudinal speed thereof without an abrupt shock to the publication stack which could cause disarrangement thereof. In this manner, the longitudinal speed of the publication stack is reduced more closely corresponding to the speed of the following slower conveyor lines.

It is still an additional object of this invention to provide an outfeed conveyor mechanism adapted for use in a high speed publication printing plant which may provide any one or all of the foregoing unique and advantageous features of construction providing the same with maximum versatility, and accurate and positive operation so as to have virtually trouble free performance. Furthermore, the outfeed conveyor mechanism of the present invention is readily adaptable to various forms of selective automatic control. For instance, with the opposite directional outfeed conveyor mechanism provided with the proper programmable control system, predetermined particular publication stacks in any given order may be moved away from the stack receiving surface in the particular longitudinal direction previously determined, again greatly augmenting the versatility of the overall publication printing plant.

Other objects and advantages of the invention will be apparent from the following specification and the accompanying drawings which are for the purpose of illustration only.

BRIEF DESCRIPTION OF THE DRAWINGS

FIG. 2 is an enlarged, fragmentary, side elevational view opposite from that of FIG. 1 and with certain sideplates of the outfeed conveyor mechanism removed to more clearly show the mechanical structure thereof;

FIG. 6 is an enlarged, fragmentary, vertical sectional view through one of the pusher mechanism or pusher bars of FIGS. 1 through 4.

DESCRIPTION OF THE BEST EMBODIMENT CONTEMPLATED

Figure 1:
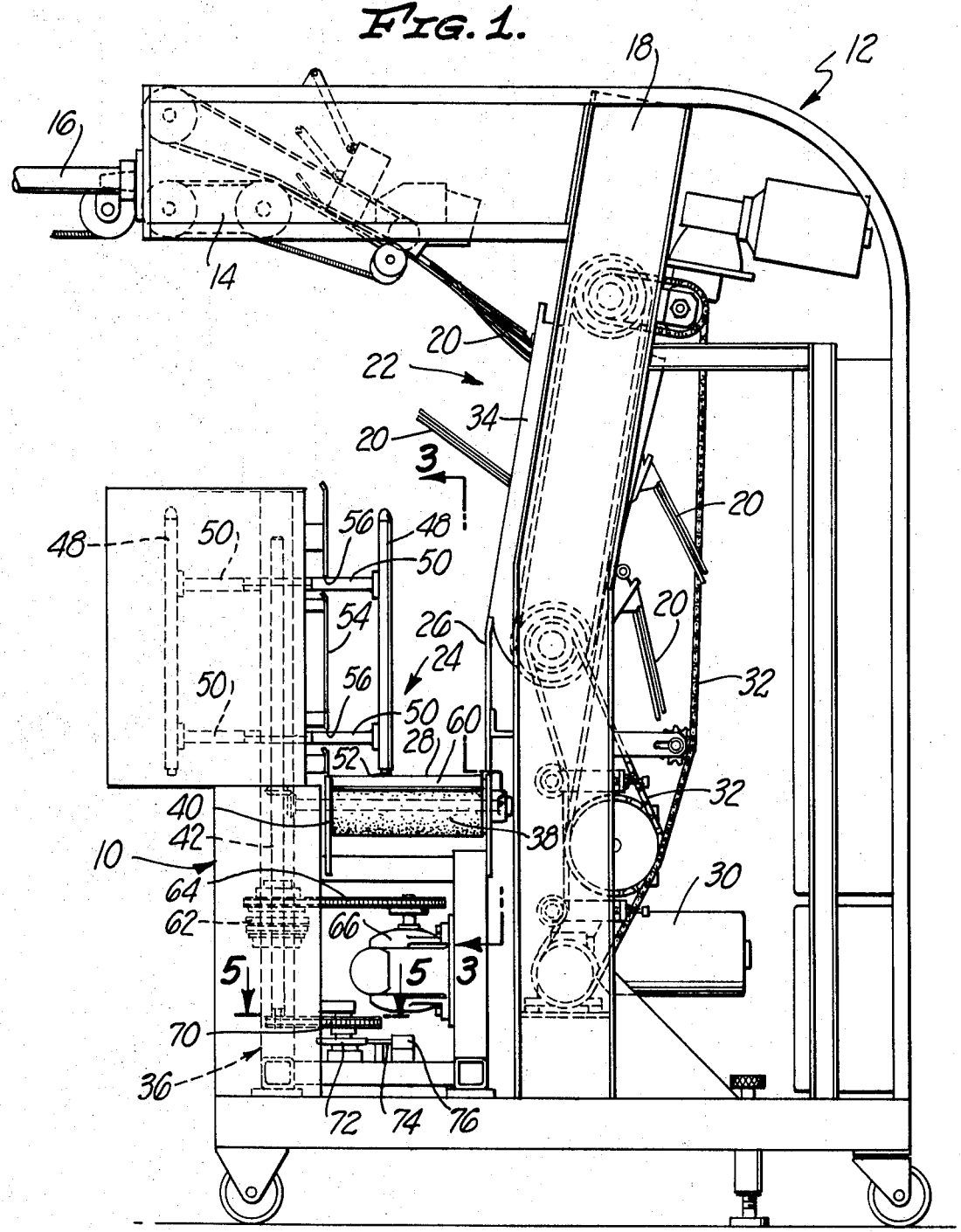
FIG. 1 is a fragmentary, side elevational view of a preceding conveyor mechanism in the form of a publication stacker operably connected to an embodiment of the outfeed conveyor mechanism of the present invention.
Figure 5:
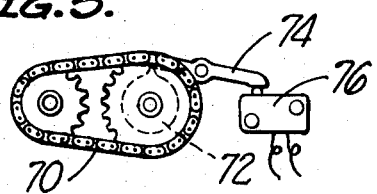
FIG. 5 is an enlarged, fragmentary, horizontal sectional view looking in the direction of the arrows 5–5 in FIG. 1.

Referring to the drawings, an embodiment of the outfeed conveyor mechanism incorporating the principles of the present invention, said outfeed conveyor mechanism being generally indicated at 10, is shown in combination and integrated with a preceding conveyor mechanism in the form of a publication stacker generally indicated at 12, an infeed section 14 of said publication stacker being, inturn, operably connected to the end of a conveyor 16 for receiving a continuous stream of imbricated publications therefrom. The publication stacker 12 is of a unique form fully disclosed and described in the copending U.S. Pat. application Ser. No. 717,231, filed Mar. 29, 1968, entitled Automatic Stacking Device for Publication Conveyor, and will only be described herein to the extent necessary for a clear understanding of the construction and operation of the outfeed conveyor mechanism 10 and the cooperation of said publication stacker in combination with said outfeed conveyor mechanism. It should be clearly understood, however, that at least the broader principles of the present invention are applicable to outfeed conveyor mechanisms for conveying a variety of items and adapted for use in combination with a variety of preceding conveyor mechanisms, including many other forms of publication stackers, so that it is not intended to limit the principles of the present invention to the particular forms and combinations shown.

Referring particularly for the moment to the publication stacker 12, said publication stacker includes a main frame 18 mounting a series of spaced support members 20 movable in a continuous path in said spaced relationship downwardly through a stacking station generally indicated at 22. The infeed section 14 directs the continuous stream of imbricated publications received from the conveyor 16 into the upper portion of the stacking station 22 and onto the support members 20 for building stacks of publications on said support members. Upon the completion of a stack of publications on a particular support member 20, the support member moves progressively downwardly and generally vertically deposits said publication stack at a unit or stack receiving station generally indicated at 24 of the outfeed conveyor mechanism 10.

With the particular form of publication stacker 12 shown, the publication stacks are moved downwardly through the stacking station 22 on the support members 20 sliding generally vertically downwardly along a stacker guide surface 26, defined extending longitudinally relative to the outfeed conveyor mechanism 10 as will be hereinafter more fully explained. Furthermore, the particular vertically downward deposit of the publication stacks by the support members 20 at the stack receiving station 24 of the outfeed conveyor mechanism 10 is accomplished by generally horizontal withdrawal of the support members from beneath said publication stacks, said support member withdrawal preferably being totally above a generally horizontal unit or stack receiving surface generally indicated at 28 of the outfeed conveyor mechanism so that said stack receiving surface may be a continuous longitudinally extending surface and it is unnecessary for the support members to pass downwardly therethrough.

The support members 20 of the publication stack 12 are driven in their continuous stacking and withdrawal path by an electric drive motor or motors 30 through appropriately connected drive chains 32 and said support members are guided for their proper stack depositing withdrawls as hereinbefore described by various guide means 34. More important to the principles of the present invention is the fact that the movements of the publication stacker 12 are synchronized and coordinated with the movements of the outfeed conveyor mechanism 10 so that the stacking and outfeed conveying of said mechanisms is continuous and at relatively high speed, far greater than has heretofore been possible with prior constructions for reasons which will be hereinafter more clearly apparent.

The outfeed conveyor mechanism 10 is supported on a main frame generally indicated at 36 which, in the particular embodiment illustrated, is integrated with the main frame 18 of the publication stacker 12. The generally horizontal, longitudinal stack receiving surface 28 is formed by an upper strand of a flat conveyor belt 38 longitudinally movably supported on the main frame 36 by a pair of longitudinally spaced an transversely extending flat belt drive rollers 40. The ends of the drive rollers 40 spaced from the publication stacker 12 are gear connected for drive by aligned, vertical drive shafts 42, upper portions of said drive shafts extending upwardly from the gear connection to the drive rollers 40 and mounting pairs of vertically spaced drive sprockets 44.

The drive sprockets 44 mount vertically spaced drive chains 46 which, in turn, support a series of spaced pusher mechanism in the form of vertical pusher bars 48 secured to the chains through T-shaped brackets 50. As can be clearly seen in FIGS. 3 and 4, the vertical pusher bars 48 are equally spaced about the drive chains 46 so that normally, with the drive chains stationary, two of said pusher bars will be positioned vertically overlying and transversely intermediate the stack receiving surface 28 of the conveyor belt 38, spaced slightly longitudinally inwardly from the longitudinal ends of said conveyor belt. With the two pusher bars 48 normally in the position described, the third pusher bar is spaced transversely from the stack receiving surface 28 of the conveyor belt 38 in the direction away from the publication stacker 12 and is longitudinally midway of the conveyor belt longitudinal extension.

Figure 3:
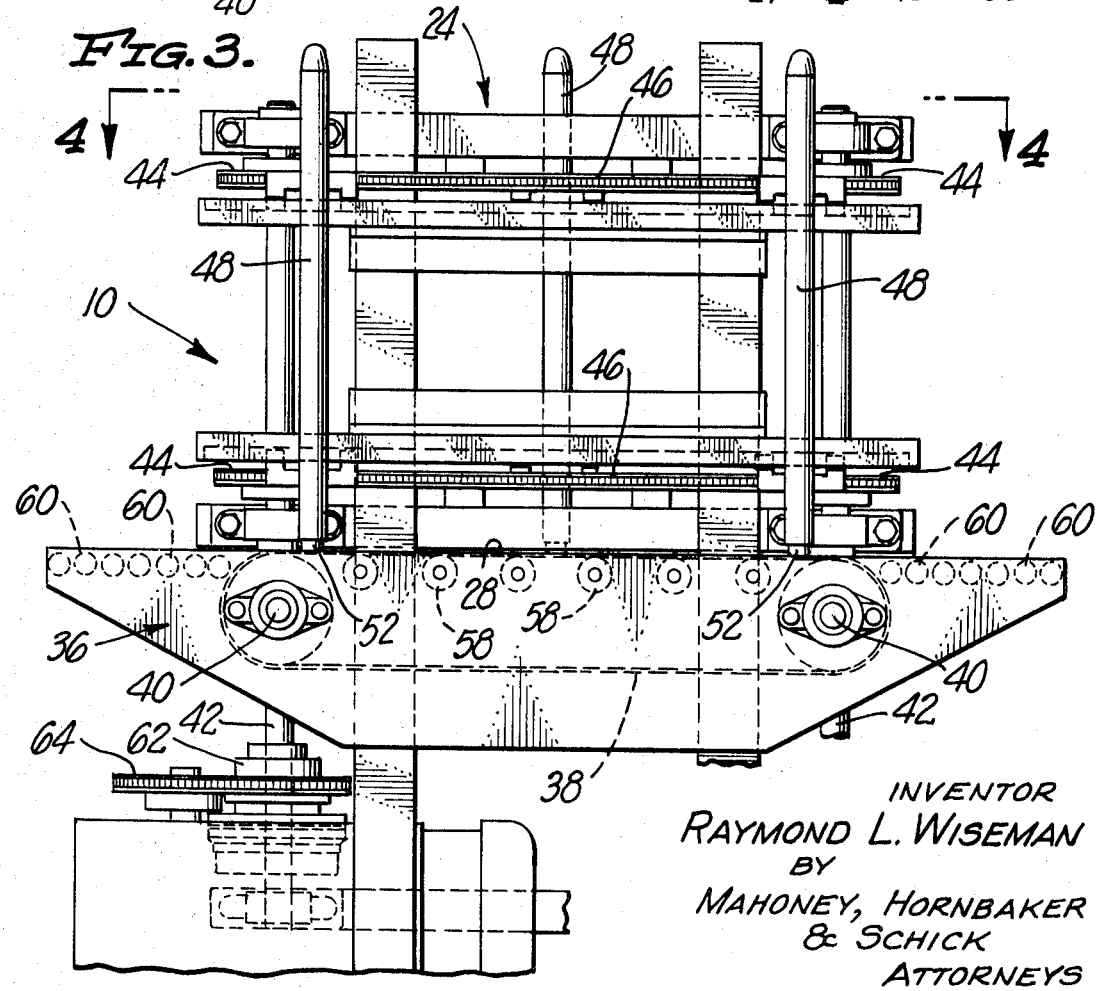
FIG. 3 is an enlarged, fragmentary, vertical sectional view looking in the direction of the arrows 3–3 in FIG. 1.

As seen in FIGS. 1, 2 and 3, and shown in detail in FIG. 6, lower ends of the pusher bars 48 each telescopically receive a vertically downwardly resiliently urged bar extension part 52 which downwardly engages the stack receiving surface 28 of the conveyor belt 38 when that particular pusher bar 48 vertically overlies said conveyor belt surface. Further, a generally vertical and longitudinally extending guide surface 54 is formed on the main frame 36 of the outfeed conveyor mechanism 10 preferably positioned at the longitudinal edge of the conveyor belt 38. The pusher bar brackets 50, when the particular of said pusher bars are overlying the conveyor belt 38 extend transversely through longitudinal slots 56 defined in the outfeed conveyor guide surface 54 so that the pusher bars 48 may be moved longitudinally in either direction spaced transversely outwardly from said guide surface 54.

Thus, the stack receiving station 24 of the outfeed conveyor mechanism 10 in the particular embodiment illustrated is defined on the horizontal stack receiving surface 28 of the conveyor belt 38 longitudinally by the normal positioning of any two of the pusher bars 48 and transversely between the stacker guide surface 26 and the outfeed conveyor guide surface 54. Such defined stack receiving station 24 is aligned with the publication stacker 12 and the movement of the support members 20 thereof so as to receive the stacks of publications from the support members 20 deposited generally vertically downwardly onto the stack receiving surface 28. With the three pusher bars 48 and the equal spacing thereof, it is obviously only necessary to move the pusher bars one of the spacings therebetween for providing one of the pusher bars normally positioned at either longitudinal end of the stack receiving station 24, the one pusher bar moving longitudinally across the stack receiving station while the other pusher bar moves away from its station end, depending on the particular longitudinal direction of movement of the pusher bars by their drive chains 46.

Figure 4:
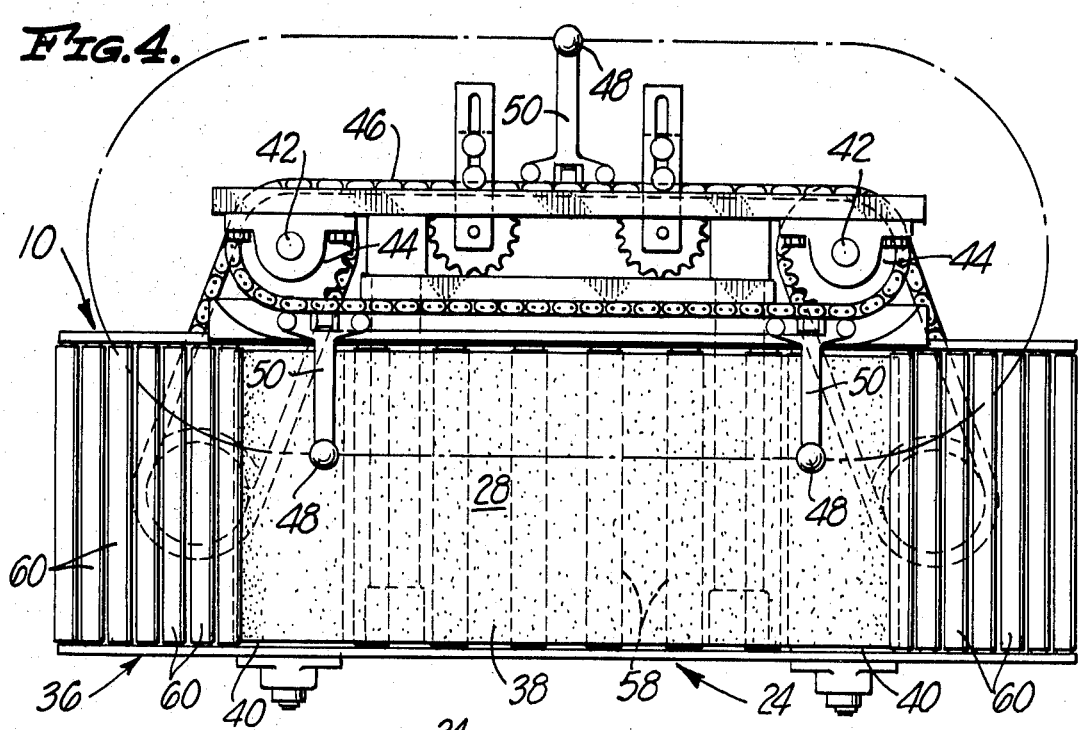
FIG. 4 is a top plan view looking in the direction of the arrows 4–4 in FIG. 3.

The stack receiving surface 28 formed by the upper strand of the conveyor belt 38 is vertically supported longitudinally between the flat belt drive rollers 40 for, in turn, supporting the weight of the particular stack of publications deposited at the stack receiving station 24 by a series of freely rotatable, longitudinally spaced and transversely extending support rollers 58 as shown in hidden lines in FIGS. 3 and 4, and more important, a group of freely rotatable, longitudinally spaced and transversely extending conveying rollers 60 is positioned on the main frame 36 longitudinally outwardly of either longitudinal end of the conveyor belt 38, said groups of conveying rollers 60 being generally horizontally and longitudinally aligned with the stack receiving surface 28 of the conveyor belt. Important to the high speed operating characteristics of the outfeed conveyor mechanism 10 is the fact that the conveying rollers 60 of said groups are not only freely rotatable, but low inertia rollers formed of a light material, such as aluminum, so as to have such low inertia characteristics. By the term "low inertia rollers" it is intended to mean that these conveying rollers 60, in view of their light material composition, will tend to quickly lose rotating inertia supplied thereto by a stack of publications passing thereover so that these rollers will quickly come to reduced speed or to rest between outfeed conveying movements of the outfeed conveyor mechanism 10 and thereby serve to retard longitudinal movement of a particular publication stack passing thereover even though said publication stack is moved at extremely high speed from the stack receiving station 24, all of which will be hereinafter further explained.

Returning to the drive of the conveyor belt 38 and the pusher bars 48, both of the drive shafts 42 extend downwardly from their gear connections to the flat belt drive rollers 40 and through an electrically actuated clutch 62, which clutches are connected through drive chains 64 to preferably constantly rotating, but reversely rotating, electric drive motors 66, that is, the one drive motor rotates in reverse direction to the other drive motor. Each of the clutches 62 is arranged so that when said clutch is actuated, it will transmit rotatable drive from its particular drive motor 66 to its particular drive shaft 42, and when deactuated will be free of transmitting said rotatable drive. Spaced below the clutches 66, one of the drive shafts 42 is connected to an electrically actuated brake 68, as best seen in FIG. 2, and the other drive shaft 42 is connected through a drive chain 70 to a rotatable cam 72, as best seen in FIG. 1.

The brake 68 is arranged so that when actuated, it will retain its drive shaft 42 stationary, and when deactuated will be free of effect on said drive shaft. The cam 72 is arranged for operation of a pivotal switch arm 74, which switch arm operates an electrical control switch 76. In view of the rotatable chain connection between the drive shafts 42 by the drive chains 46 of the pusher bars 48, engagement of either of the clutches 62 will drive the conveyor belt 38 and the pusher bars 48 in the direction of that clutch's rotation by its drive motor 66, while at the same time, engagement of the brake 68 will stop both the conveyor belt and the pusher bars, and any movements by the conveyor belt and the pusher bars will cause corresponding rotation of the cam 72.

As will be hereinafter explained in proper sequence, the outfeed conveyor mechanism 10 is coordinated and synchronized with the publication stacker 12 so that, during the approach of a publication stack on the publication stacker for deposit at the stack receiving station 24 onto the stack receiving surface 28 formed by the conveyor belt 38 and between two normally positioned of the pusher bars 28, the conveyor belt and the pusher bars are stationary. The electrical system of the outfeed conveyor mechanism 10 is such that at this time, although both of the drive motor 66 are rotating in opposite directions, both of the clutches 62 are disengaged and the brake 68 is engaged. The engagement of the brake 68 positively retains the conveyor belt 38 and the pusher bars 48 in such normal stationary position.

Momentarily upon the particular publication stack being deposited upon the stack receiving surface 28 of the conveyor belt 38, however, such deposit is sensed through sensing means of any one of various conventional forms, such as pressure switches or photoelectric means, none of which are shown, with said sensing means immediately actuating one of the clutches 62 and deactuating the brake 68 so as to move both the conveyor belt 38 and the pusher bars 48 in one direction or the other, depending on the particular clutch actuated and the direction of its particular drive motor 66. During the movement of the conveyor belt 38 and the pusher bars 48, the cam 72 is correspondingly rotated, said cam being appropriately driven and the control switch 76 being appropriately electrically connected so that one complete revolution of the cam 72 will exactly permit the synchronized movement of the conveyor belt 38 and the pusher bars 48 one longitudinal distance or length of the stack receiving station 24, that is, one of the pusher bars 48 and the conveyor belt 38 will move exactly from one longitudinal end of the stack receiving station longitudinally thereacross to the other longitudinal end thereof. At the end of this one station movement, the cam 72 will have completed its one revolution and through the switch arm 74, cause operation of the control switch 76 to actuate the brake 68 and deactuate the particular actuated clutch 62, thereby stopping the conveyor belt 38 and the pusher bars 48 placing two of the pusher bars in the normal positions shown.

The choice of which longitudinal direction will be imparted to the conveyor belt 38 and the pusher bars 48, which, in effect is the choice of which of the clutches 62 is to be actuated for a particular publication stack, may be determined in a variety of conventional manners depending on a variety of circumstances, such as the particular requirements of the printing plant, the speed of operation of the outfeed conveyor mechanism 10 and the publication stacker 12 and the particular goal sought to be accomplished. For instance, the electrical control system of the outfeed conveyor mechanism 10 could be arranged for providing such choice by manually operated switch means, or could be completely automatically programmed through a well-known electronic computer system or punched tape systems. Furthermore, the electrical control system of the outfeed conveyor mechanism 10 could be automatically controlled for alternate directional outfeed conveying, one publication stack in one longitudinal direction and the next in the other longitudinal direction, none of said control systems being shown herein, but all well-known to those skilled in the art.

In operation of he outfeed conveyor mechanism 10 with the publication stacker 12, therefore, as one of the support members 20 of the publication stacker approaches the stack receiving station 24 of the outfeed conveyor mechanism with a publication stack, the outfeed conveyor mechanism is momentarily stationary except for the constant rotation of the drive motors 66 in their opposite direction. In other words, the stack receiving surface 28 of the conveyor belt 38 is stationary, the pusher bars 48 are stationary with two of the same in the normal positions at opposite longitudinal ends of the stack receiving station, the clutches 62 are deactuated and the brake 68 is actuated. The deposit of the particular publication stack at the stack receiving station 24 onto the stack receiving surface 28 subsequently takes place longitudinally between the two pusher bars 48 and transversely between the stacker guide surface 26 and the outfeed conveyor guide surface 54 so as to retain proper vertical alignment of the publications in said stack.

Immediately upon the stack being deposited at the stack receiving station 24, the brake 68 is deactuated and one of the clutches 62 is actuated to begin longitudinal movement of the conveyor belt 38 and the pusher bars 48. During such movement the conveyor belt 38 and the pusher bars 48 move in synchronized movement, the conveyor belt urging the stack longitudinally from the stack lower surface, while one of the pusher bars 48 end urges the stack longitudinally and the other pusher bar moves first longitudinally and then transversely, permitting publication stack longitudinal movement. Also, during such publication stack longitudinal movement from the stack receiving station 24, the vertical arrangement for alignment of the publication stack is retained not only by the stack end engagement of the pusher bar 48, but transversely by the stacker guide surface 26 and the outfeed conveyor guide surface 54, despite the fact that this commencement and continuance of longitudinal stack movement may be at relatively high speed.

As the publication stack leaves the stack receiving station 24 and ultimately the stack receiving surface 28 of the conveyor belt 38, the publication stack moves onto the group of slower moving or stationary, low inertia conveying rollers 60 so that the publication stack longitudinal speed is immediately and gently reduced. As an example, the longitudinal speed of the conveyor belt 38 and the pusher bars 48, which would be that of the publication stack, may be as high as 400 feet per minute, and will be reduced by the group of conveying rollers 60 to as low as 160 feet per minute, the lower speed more nearly conforming with the conventional speed of the usual conveyor lines connected to the outfeed conveyor mechanism 10 for receiving the publication stack.

Upon the pusher bar 48 moving longitudinally across the stack receiving station 24 reaching the opposite longitudinal end of said stack receiving station, the cam 72 will have made exactly one complete revolution and will then operate the control switch 76 to deactuate the then actuated clutch 62 and actuate the brake 68. This stops both the conveyor belt 38 and the pusher bars 48 with two of the pusher bars in their normal stationary positions at the opposite longitudinal ends of the stack receiving station 24. The outfeed conveyor mechanism 10 is then in stationary position ready for vertical downward deposit of the next publication stack by the publication stacker 12 which will once again commence the movement of the conveyor belt 38 and the pusher bars 48 in the same or the opposite longitudinal direction and with the same sequence of operation hereinbefore described.

According to the principles of the present invention, therefore, an outfeed conveyor mechanism adapted for use in a high speed publication printing plant is provided wherein the stack arrangement of the publication stack is maintained despite high speed outfeed conveyance of said stack. The outfeed conveyor mechanism 10 may be provided to supply longitudinal outfeed movement to the publication stack both through the stack lower surface by the conveyor belt 38 and at one longitudinal end by one of the pushers bars 48, while the stack is further guided by the generally vertical stacker guide surface 26 and outfeed conveyor guide surface 54. If, of course, the high speed outfeed conveying of the stack is not required for the particular printing plat installation, the outfeed conveyor mechanism 10 may be arranged with either the longitudinally movable conveyor belt 38 or the longitudinally movable pusher bars 48, again the same being controlled reversibly driven where the printing plant requirements dictate.

Furthermore, where extremely high speed outfeed conveyance of the publication stacks is required, the outfeed conveyor mechanism 10 may be provided with the group or groups of conveying rollers 60 at he ends or ends of the stack receiving station 24 or the stack receiving surface 28. The groups of conveying rollers 60, being low inertia rollers, will serve to gently slow down the longitudinal movement of the publication stack from the stack receiving station 24 so that the longitudinal speed thereof will conform more nearly to following conveyor lines. Still further, due to the resiliently urged engagement of the pusher bars 48 with the conveyor belt 38 during the longitudinal pushing or urging of the publication stack from the stack receiving station 24, it is impossible for even the lowermost of the publications in the stack to become disarranged therefrom.

I claim:

1. In an outfeed conveyor mechanism for receiving and conveying units such as stacks of publications and the like from a preceding conveyor mechanism, the combination of: a main frame; a conveying device on said main frame defining a longitudinal, generally horizontal unit receiving surface forming a unit receiving station; means mounting at least portions of said unit receiving surface movable in opposite directions for moving units in either longitudinal direction generally horizontally from said unit receiving station received from a preceding conveyor mechanism onto said unit receiving surface; driving means operably connected to said conveying device for intermittently moving at least said unit receiving surface portions in either of said opposite directions; said conveying device including a pusher mechanism mounted normally positioned at each of longitudinal ends of longitudinal ends of said unit receiving station above said unit receiving surface longitudinally engageable with said units received onto said unit receiving surface, means for moving and pusher mechanisms in synchronous movement with said unit receiving surface in the same direction as said unit receiving surface and longitudinally across said unit receiving station.

2. An outfeed conveyor mechanism as defined in claim 1 in which said conveying device pusher mechanisms include at least three pusher mechanisms movable above said unit receiving surface and longitudinally across said unit receiving station, one of said pusher mechanisms normally being positioned at each longitudinal end of said unit receiving station with the other of said pusher mechanisms transversely spaced from said unit receiving surface longitudinally intermediate said unit receiving station, said pusher mechanism moving means including means for simultaneously moving said pusher mechanisms in synchronous movement with said unit receiving surface with one of said pusher mechanisms always moving longitudinally across said unit receiving station in the same direction as said unit receiving surface, said pusher mechanisms being positioned 3. An outfeed conveyor mechanism as defined in claim 1 in which said conveying device pusher mechanisms include three pusher bars mounted movable longitudinally across said unit receiving station above and transversely intermediate said unit receiving surface, one of said pusher bars normally being positioned at each longitudinal end of said unit receiving station with the other of said bars longitudinally midway of said unit receiving station ends and transversely spaced from said unit receiving surface, said pusher mechanism moving means including means for moving said pusher bars one at a time longitudinally across said unit receiving station in synchronized movement with said unit receiving surface, said pusher bars being positioned longitudinally engageable with units received on said unit receiving surface.

4. An outfeed conveyor mechanism as defined in claim 1 in which said conveying device includes a flat, continuous conveyor belt having an upper section forming said unit receiving surface, said pusher mechanisms including at least two pusher bars mounted movable above and longitudinally across said unit receiving station, one of said pusher bars normally being positioned at each longitudinal end of said unit receiving station engageable with units received on said unit receiving surface, said pusher mechanism moving means including means for moving said pusher bars in synchronized movement with said unit receiving surface, each of said pusher bars having a lower end resiliently urged into engagement with said conveyor belt upper section during movement of said pusher bars longitudinally across said unit receiving station.

5. An outfeed conveyor mechanism as defined in claim 1 in which said driving means is operably connected to both said unit receiving surface and said means for moving said pusher mechanisms for simultaneously intermittently moving at least said unit receiving surface portions and said pusher mechanisms, said driving means including constantly running and opposite directional drive motors operably connected through clutches at at least one brake to said unit receiving surface and pusher mechanisms, one of said clutches being engaged and the other of said clutches and said brake being disengaged during each movement of said unit receiving surface portions and pusher mechanisms, each of said clutches being disengaged and said brake being engaged between movements of said unit receiving surface portions and pusher mechanisms.

6. An outfeed conveyor mechanism as defined in claim 1 in which said conveying device includes a flat, continuous conveyor belt having the upper section thereof forming said unit receiving surface and in which a group of longitudinally spaced and transversely extending rollers is positioned longitudinally adjacent said unit receiving surface at each of said longitudinal ends of said unit receiving station, each of said rollers being mounted freely rotatable and being a low inertia roller.

7. In an outfeed conveyor mechanism for receiving and conveying units such as stacks of publications and the like from a preceding conveyor mechanism, the combination of: a main frame; a longitudinal, generally horizontal unit receiving surface formed on said main frame defining a unit receiving station; pusher mechanisms on said frame positioned actionable above said unit receiving surface at said unit receiving station, there being one of said pusher mechanisms normally positioned at each longitudinal end of said unit receiving station extending transversely intermediate said unit receiving surface, said pusher mechanisms normally straddling a unit received on said unit receiving surface at said unit receiving station; means mounting both of said pusher mechanisms simultaneously movable in either longitudinal direction along said unit receiving surface longitudinally across said unit receiving station for engaging a unit received on said unit receiving surface at said unit receiving station from a preceding conveyor mechanism and moving said unit longitudinally and generally horizontally in either direction from said unit receiving station, one of said pusher mechanisms moving longitudinally across said unit receiving station while the other of said pusher mechanisms moves away from its longitudinal end of said unit receiving station permitting said unit to be moved from said unit receiving station; and driving means operably connected to said pusher mechanisms for intermittently and simultaneously moving said pusher mechanisms in either of said directions across said unit receiving station.

8. An outfeed conveyor mechanism as defined in claim 7 in which said pusher mechanisms include at least three of said pusher mechanisms on said main frame positioned actionable above said unit receiving surface, two of said pusher mechanisms normally being positioned at opposite longitudinal ends of said unit receiving station transversely intermediate said unit receiving surface while the other of said pusher mechanisms is positioned transversely spaced from said unit receiving station, said pusher mechanisms normally positioned at said opposite longitudinal ends of said unit receiving station normally straddling said unit received on said unit receiving surface at said unit receiving station; in which said means mounting said pusher mechanisms includes means mounting all of said pusher mechanisms movable one at a time in either longitudinal direction along said unit receiving surface longitudinally across said unit receiving station, one of said pusher mechanisms during movement of said pusher mechanisms moving longitudinally across said unit receiving station while a second of said pusher mechanisms moves away from its longitudinal end of said unit receiving station and while a third of said pushed mechanisms approaches the original position of said one pusher mechanism permitting said unit to be moved longitudinally from said unit receiving station; and in which said driving means is operably connected to all of said pusher mechanisms for intermittently and simultaneously moving said pusher mechanisms in either of said opposite directions.

9. An outfeed conveyor mechanism as defined in claim 7 in which each of said pusher mechanisms includes a gernerally vertically extending pusher bar, said pusher bars normally being positioned at opposite longitudinal ends of said unit receiving station and transversely intermediate said unit received on said unit receiving surface at said unit receiving station; and in which a group of longitudinally spaced and transversely extending rollers is mounted at each of said longitudinal ends of said unit receiving station, each of said roller groups including a series of freely rotatable and low inertia rollers generally longitudinally and horizontally aligned with said unit receiving surface.

10. An outfeed conveyor mechanism as defined in claim 7 in which said driving means includes two constantly and oppositely rotating drive motors operably connected through clutch means to both of said pusher mechanisms and brake means operably connected to both of said pusher mechanisms, said clutch means being operable when actuated to transmit drive form either of said drive motor for moving said pusher mechanisms while being free of transmitting drive from the other of said drive motors, said clutching means being free of transmitting said drive to either of said pusher mechanisms when deactuated, said brake means being operable to retain said pusher mechanisms stationary when said clutch means is deactuated and being free of retainment of said pusher mechanisms when said clutch means is actuated.

11. In a conveyor system for conveying units such as stacks of publications and the like, the combination of: an outfeed conveyor mechanism; a longitudinal, generally horizontal unit receiving s surface on said outfeed conveyor mechanism forming a unit receiving station; a movable preceding conveyor mechanism aligned with said unit receiving surface at said unit receiving station; driving means operably connected to said preceding conveyor mechanism for moving said preceding conveyor mechanism to intermittently deposit units onto said unit receiving surface at said unit receiving station; means mounting at least portions of said unit receiving surface of said outfeed conveyor mechanism movable in opposite directions for moving said units intermittently deposited by said preceding conveyor mechanism in either longitudinal direction from said unit receiving station of said outfeed conveyor mechanism; driving means operably connected to said outfeed conveyor mechanism and synchronized with movements of said preceding conveyor mechanism for intermittently moving at least said unit receiving surface portions of said outfeed conveyor mechanism in either of said opposite directions upon said preceding conveyor mechanism depositing a unit on said unit receiving surface of said outfeed conveyor mechanism; said preceding conveyor mechanism including means for intermittently depositing units generally vertically downwardly onto said unit receiving surface at said unit receiving station; generally vertically extending guide surface means operably positioned on certain of said preceding and outfeed conveyor mechanisms at opposite transverse sides of said unit receiving surface for guiding said units from said preceding conveyor mechanism to said unit receiving surface at said unit receiving station and from said unit receiving station along said outfeed conveyor mechanism.

12. A conveyor system as defined in claim 19 in which at least two pusher mechanisms are positioned on said outfeed conveyor mechanism normally at opposite longitudinal ends of said unit receiving station transversely intermediate said unit receiving surface and simultaneously movable in either of opposite directions with one of said pusher mechanisms moving longitudinally across said unit receiving station, the other of said pusher mechanisms moving away from its longitudinal end of said unit receiving station when said one pusher mechanism is moving longitudinally across said unit receiving station to permit said unit deposited by said preceding conveyor mechanism on said unit receiving surface to be moved longitudinally from said unit receiving station; and in which said driving means operably connected to said outfeed conveyor mechanism is also operably connected to said pusher mechanism for intermittently moving said pusher mechanisms in synchronized movement with said unit receiving surface portions and in the same direction as said unit receiving surface portions.

13. In a conveyor system for conveying units such as stacks of publications and the like, the combination of: an outfeed conveyor mechanism; a longitudinal, generally horizontal unit receiving surface on said outfeed conveyor mechanism forming a unit receiving station; a moveable preceding conveyor mechanism aligned with said unit receiving surface at said unit receiving station; driving means operably connected to said preceding conveyor mechanism for moving said preceding conveyor mechanism to intermittently deposit units onto said unit receiving surface at said unit receiving station; a pusher mechanism on said unit receiving station; a pusher mechanism on said outfeed conveyor mechanism positioned actionable above said unit receiving surface at said unit receiving station; means mounting said pusher mechanism movable in at least one longitudinal direction along said unit receiving surface longitudinally across said unit receiving station for engaging said units intermittently deposited by said preceding conveyor mechanism and moving said units longitudinally and generally horizontally in said one direction from said unit receiving station; and driving means operably connected to said outfeed conveyor mechanism and synchronized with movements of said preceding conveyor mechanism for intermittently moving said pusher mechanism in said one direction across said unit receiving station of said outfeed conveyor mechanism.

14. A conveyor system as defined in claim 13 in which there is one of said pusher mechanisms normally positioned at each longitudinal end of said unit receiving station extending transversely intermediate said unit receiving surface, said pusher mechanisms normally straddling said units deposited by said preceding conveyor mechanism onto said unit receiving surface at said unit receiving station; in which said means mounting said pusher mechanism includes means mounting both of said pusher mechanisms simultaneously movable in either longitudinal direction along said unit receiving surface longitudinally across said unit receiving station, one of said pusher mechanisms moving longitudinally across said unit receiving station while the other of said pusher mechanisms moves away from its longitudinal end of said unit receiving station permitting said units to be moved from said unit receiving station; and in which said driving means operably connected to said outfeed conveyor mechanism is operably connected to both said pusher mechanisms for intermittently and simultaneously moving said pusher mechanisms in synchronized movements with said preceding conveyor mechanism for intermittently moving said pusher mechanisms in either of said directions.

15. An outfeed conveyor mechanism as defined in claim 12 in which said preceding conveyor mechanism includes means for intermittently depositing units generally vertically downwardly onto said unit receiving surface at said unit receiving station; and in which generally vertically extending guide surface means is operably positioned on certain of said preceding and outfeed conveyor mechanisms at opposite transverse sides of said unit receiving surface for guiding said units from said preceding conveyor mechanism to said unit receiving surface at said unit receiving station and from said unit receiving station along said outfeed conveyor mechanism.

16. An outfeed conveyor mechanism as defined in claim 13 in which said preceding conveyor mechanism includes means for intermittently depositing units generally vertically downwardly onto said unit receiving surface at said unit receiving station; in which generally vertically extending guide surface means operably positioned on certain of said preceding and outfeed conveyor mechanisms at opposite transverse sides of said unit receiving surface for guiding said units from said preceding conveyor mechanism to said unit receiving surface at said unit receiving station and from said unit receiving station along said outfeed conveyor mechanism; in which there is one of said pusher mechanisms normally positioned at each longitudinal end of said unit receiving station extending transversely intermediate said unit receiving surface, said pusher mechanisms normally straddling said units deposited by said preceding conveyor mechanism onto said unit receiving surface at said unit receiving station; in which said means mounting said pusher mechanism includes means mounting both of said pusher mechanisms simultaneously movable in either longitudinal direction along said unit receiving surface longitudinally across said unit receiving station, one of said pusher mechanisms moving longitudinally across said unit receiving station while the other of said pusher mechanisms moves away from its longitudinal end of said unit receiving station permitting said units to be moved from said unit receiving station; and in which said driving means operably connected to said outfeed conveyor mechanism is operable connected to both said pusher mechanisms for intermittently and simultaneously moving said pusher mechanisms in synchronized movements with said preceding conveyor mechanism for intermittently moving said pusher mechanisms in either of said directions.

17. In a conveyor system for conveying units such as stacks of publications and the like, the combination of: an outfeed conveyor mechanism; a longitudinal, generally horizontal unit receiving surface on said outfeed conveyor mechanism forming a unit receiving station; a movable preceding conveyor mechanism aligned with said unit receiving surface at said unit receiving station; driving means operably connected to said preceding conveyor mechanism to intermittently deposit units onto said unit receiving surface at said unit receiving station; means mounting at least portions of said unit receiving surface of said outfeed conveyor mechanism movable in opposite directions for moving said units intermittently deposited by said preceding conveyor mechanism in either longitudinal direction from said unit receiving station of said outfeed conveyor mechanism; and driving means operably connected to said outfeed conveyor mechanism and synchronized with movements of said preceding conveyor mechanism for intermittently moving at least said unit receiving surface portions of said outfeed conveyor mechanism in either of said opposite directions upon said preceding conveyor mechanism depositing a unit on said unit receiving surface of said outfeed conveyor mechanism; at least two pusher mechanisms positioned on said outfeed conveyor mechanism normally positioned at opposite longitudinal ends of said unit receiving surface and simultaneously movable in either of opposite directions with one of said pusher mechanisms moving longitudinally across said unit receiving station, the other of said pusher mechanisms moving away from its longitudinal end of said unit receiving station when said one pusher mechanism is moving longitudinally across said unit receiving station to permit said unit deposited by said preceding conveyor mechanism on said unit receiving surface to be moved longitudinally from said unit receiving station; said driving means operably connected to said outfeed conveyor mechanism also being operably connected to said pusher mechanisms for intermittently moving said pusher mechanisms in synchronized movement with said unit receiving surface portions and in the same direction as said unit receiving surface portions.

18. In an outfeed conveyor mechanism for receiving and conveying units such as stacks of publications and the like from a preceding conveyor mechanism, the combination of: a main frame; a conveying device on said main frame defining a longitudinal, generally horizontal unit receiving surface forming a unit receiving station; means mounting at least portions of said unit receiving surface movable in opposite directions for moving units in either longitudinal direction generally horizontally from said unit receiving station received from a preceding conveyor mechanism onto said unit receiving surface; driving means operably connected to said conveying device for intermittently moving at least said unit receiving surface portions in either of said opposite directions; a group of longitudinally spaced, transverse rollers positioned longitudinally adjacent said unit receiving surface at longitudinal ends of said unit receiving surface, each of said roller groups being comprised of a series of freely longitudinally rotatable, low inertia rollers generally longitudinally and horizontally aligned with said unit receiving surface, said low inertia rollers each being formed of a light material such as aluminum and the like and having low inertia characteristics so as to quickly lose rotating inertia supplied thereto upon a unit passing thereover from said unit receiving surface and retard speed of movement of said unit.

19. In a conveyor system for conveying units such as stacks of publications and the like, the combination of: an outfeed conveyor mechanism; a longitudinal, generally horizontal unit receiving surface on said outfeed conveyor mechanism forming a unit receiving station; a movable preceding conveyor mechanism aligned with said unit receiving surface at said unit receiving station; driving means operably connected to said preceding conveyor mechanism for moving said preceding conveyor mechanism to intermittently deposit units onto said unit receiving surface at said unit receiving station; a pusher mechanism on said outfeed conveyor mechanism positioned actionable above said unit receiving surface at said unit receiving station; means mounting said pusher mechanism movable in at least one longitudinal direction along said unit receiving surface longitudinally across said unit receiving station for engaging said units intermittently deposited by said preceding conveyor mechanism and moving said units longitudinally and generally horizontally in said one direction from said unit receiving station; means mounting at least portions of said unit receiving surface movable in at least said one longitudinal direction of said pusher mechanism aiding said pusher mechanism in moving said units intermittently deposited by said preceding conveyor mechanism longitudinally and generally horizontally in said one direction from said unit receiving station; and driving means operably connected to said outfeed conveyor mechanism and synchronized with movements of said preceding conveyor mechanism for intermittently moving said pusher mechanism in said one direction across said unit receiving station of said outfeed conveyor mechanism and intermittently moving said at least portions of said unit receiving surface simultaneously with said movement of said pusher mechanism.

20. In a conveyor system for conveying units such as stacks of publications and the like, the combination of: an outfeed conveyor mechanism; a longitudinal, generally horizontal unit receiving surface on said outfeed conveyor mechanism forming a unit receiving station; a movable preceding conveyor mechanism aligned with said unit receiving surface at said unit receiving station; driving means operably connected to said preceding conveyor mechanism for moving said preceding conveyor mechanism to intermittently deposit units onto said unit receiving surface at said unit receiving station; pusher mechanism on said outfeed conveyor mechanism positioned actionable above said unit receiving surface at said unit receiving station including at least two pusher mechanisms. One of said pusher mechanisms being normally positioned movable across each longitudinal end of said unit receiving station and longitudinally across said unit receiving station; means mounting said pusher mechanisms simultaneously movable in either longitudinal direction along said unit receiving surface longitudinally across said unit receiving station for engaging said units intermittently deposited by said preceding conveyor mechanism and moving said units longitudinally and generally horizontally in either direction from said unit receiving station, one of said pusher mechanisms moving longitudinally across said unit receiving station while the other of said pusher mechanism moves free of said unit receiving station; and driving means operably connected to said outfeed conveyor mechanism and synchronized with movements of said preceding conveyor mechanism for intermittently and simultaneously moving said pusher mechanism in either of said directions across said unit receiving station of said outfeed conveyor mechanism.

21. A conveyor system as defined in claim 20 in which said preceding conveyor mechanism includes means for intermittently depositing units generally vertically downwardly onto said unit receiving surface at said unit receiving station; and in which generally vertically extending guide surface means is operably positioned on certain of said preceding and outfeed conveyor mechanisms at opposite transverse sides of said unit receiving surface for guiding said units from said preceding conveyor mechanism to said unit receiving surface at said unit receiving station, and from aid unit receiving station along said outfeed conveyor mechanism.